United States Patent [19]

Gray

[11] Patent Number: 5,479,606
[45] Date of Patent: Dec. 26, 1995

[54] DATA DISPLAY APPARATUS FOR DISPLAYING PATTERNS USING SAMPLES OF SIGNAL DATA

[75] Inventor: Frank O. Gray, Mountain View, Calif.

[73] Assignee: PGM Systems, Inc., Mountain View, Calif.

[21] Appl. No.: 95,661

[22] Filed: Jul. 21, 1993

[51] Int. Cl.⁶ ................................................ G06F 12/06
[52] U.S. Cl. ...................... 395/166; 395/164; 395/126; 395/162; 349/200; 349/149
[58] Field of Search ............................... 395/126, 131, 395/162–166, 132, 129; 345/10, 27, 28, 112, 147, 149, 185, 199, 147, 153, 200, 201, 134, 150; 358/445, 443, 447, 448, 450, 455, 461; 382/44, 41, 45; 364/487

[56] References Cited

U.S. PATENT DOCUMENTS

| | | | |
|---|---|---|---|
| 4,862,391 | 8/1989 | Ohhashi | 395/126 |
| 4,933,879 | 6/1990 | Ando et al. | 395/164 |
| 4,935,730 | 6/1990 | Kosuka | 345/187 |
| 4,974,167 | 11/1990 | Anderson et al. | 364/487 |
| 4,977,514 | 12/1990 | Bush | 364/487 |
| 5,367,632 | 11/1994 | Bowen et al. | 395/164 |

*Primary Examiner*—Mark R. Powell
*Assistant Examiner*—Kee M. Tung
*Attorney, Agent, or Firm*—Blakely, Sokoloff, Taylor & Zafman

[57] ABSTRACT

Digital samples of signal data are displayed on a display system in patterns that are selected for display. Stored patterns are designed to allow a rapid visual determination of whether the signal's characteristics match a previously determined signal characteristic, and if not, provide for diagnosis of the signal variation by the observer. Multiple signal channels can be simultaneously displayed in patterns to allow observation and measurement of the relationships between multiple signals. Signal data values are allowed to be displayed as pixels whose color and intensity represent specific data characteristics, and these color and intensity values can vary as a function of time as a part of the specific pattern designed for each signal type.

17 Claims, 12 Drawing Sheets

DATA DISPLAY APPARATUS FOR DISPLAYING PATTERNS USING SAMPLES OF SIGNAL DATA

BACKGROUND OF THE INVENTION

1. Field of the Invention

The present invention relates to the field of comparison, analysis and/or diagnosis of signal data by observation of displays of that data on a bit mapped display system. It applies to applications where signal data is visually analyzed to determine whether it matches previously known characteristics, to determine how it deviates from known characteristics, to determine the relationship between multiple signals, and to measure the current signal characteristics.

2. Description of the Related Art

The tasks addressed by this invention require a large high resolution display area, simultaneous multiple preprogrammed display patterns, continuous display of sequential digital data values as pixels with their position, color, and intensity representing data characteristics, and a variable display time for data pixels associated with each display pattern. Oscilloscopes have for many years been used to monitor signals for many purposes which overlap the requirements of the present invention. However, oscilloscopes do not have the capability to input preprogrammed root pixel display patterns, and cause pixels to be located on a display monitor in positions which are a function of data value and preprogrammed root pixel position. Oscilloscopes do not have the capability to vary a data pixels color and intensity as independent functions of the pixels age. Oscilloscopes do not have the capability to provide pixel priority to pixels stored in separate frame buffers, or to blend the colors of overlapping pixels stored in separate frame buffers.

SUMMARY

A computer controlled display apparatus for displaying digital samples of signal data in patterns characteristic of the signal data is disclosed. For example, television signals have specific modulation formats which identify whether the signal uses a NTSC (National Television System Committee) format or a PAL (Phase Alternation Line) format. Each type must be viewed with patterns designed for their own specific format. The present invention provides a display apparatus which allows signal data to be displayed on a color monitor in complex predetermined patterns which are specifically designed to allow an observer to rapidly recognize signal characteristics and conditions through visualization. These patterns are stored as files in an associated computer system and are selected by an operator and transferred to the display apparatus. Each predetermined display pattern file contains all "root" display memory pixel addresses required for display of a particular type of signal data. These root addresses are used with successive data samples to compute frame buffer addresses for each pixel representing a data value. In addition, each data sample stored as a pixel in the frame buffer is assigned a color and intensity related to it's data value by using Look-Up Tables (LUT) which are loaded when a display pattern is selected. Pixel data stored in the frame buffer is continuously read out to refresh the display. If required, signal data can be simultaneously displayed using different patterns which are designed to allow the observer to view different signal data characteristics.

The present invention further provides a means for modifying each data pixel stored in a frame buffer after a display refresh cycle. When a data pixel is first stored in the frame buffer, bits are included with the pixel description to identify its age. Pixel aging occurs during a frame aging cycle. Each time a frame aging cycle takes place an aging lookup table is used to specify the pixel's new age, and if desired, a new color and intensity. A frame aging cycle may take place at every or every other display refresh cycles, or at some other interval specified by the user. Control of the data pixel's color characteristic and display time is specified by the display pattern design, and is loaded in the aging lookup table when a display pattern is initiated.

The present invention may also be implemented to provide multiple channels with separate data inputs, display pattern memory, and pixel frame buffer so that multiple signals can be displayed simultaneously with patterns designed to show specific relationships between the multiple signals. A means is included for combining multiple signal data channels so that overlapping data pixels from separate pixel frame memories are merged, or blended according to the specific display pattern design. The combination of data pixels from separate frame memories is performed using lookup table memories, which contain rules for channel priority or for blending colors of overlapped pixels. These pixel combination rules are part of the pattern design, and are loaded in the combination lookup tables when initiating a new pattern display.

DETAILED DESCRIPTION OF THE PREFERRED EMBODIMENT

A data display method and apparatus for displaying digital samples of various signal data on a bit-mapped display system in patterns specific to those signals is described. In the following description, numerous specific details are set forth such as a description of display refresh cycles, in order to provide a thorough understanding of the present invention. It will be apparent, however, to one skilled in the art that the present invention may be practiced without such specific details. In other instances, specific implementation details such as circuitry for performing well known arithmetic functions have not been shown in detail in order not to unnecessarily obscure the present invention.

While the preferred embodiment of the present invention is implemented as a display system supported by a general purpose computer, it would be apparent to one skilled in the art to embody the present invention in a fixed function system. For example, an embodiment which is hand held may have a limited number of fixed patterns for monitoring characteristics of a particular type of signal. Such embodiment would not depart from the spirit and scope of the present invention.

Figure 1:
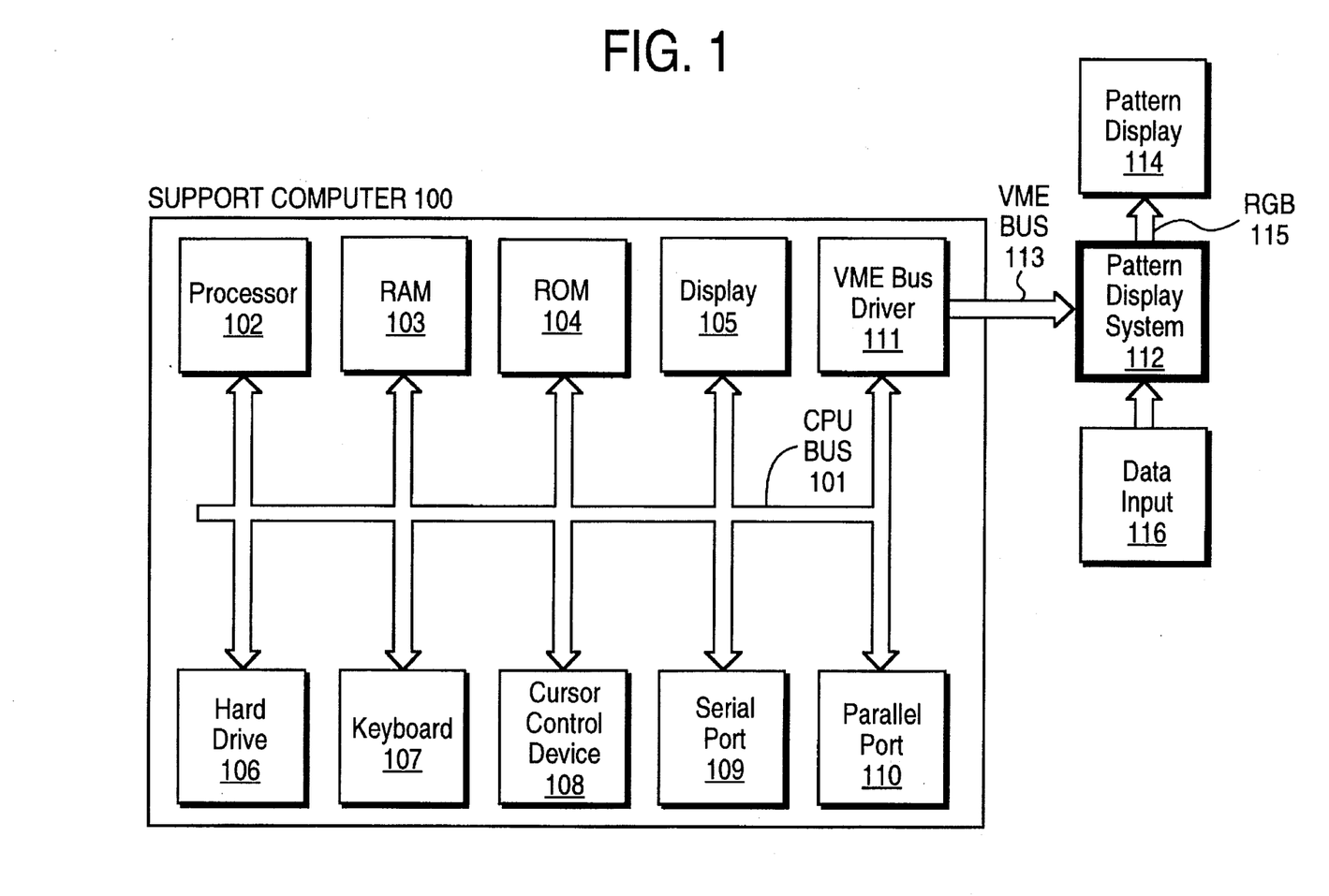
FIG. 1 is a block diagram of a computer system in which the currently preferred embodiment of the present invention may be implemented.

The support computer system 100 of the currently preferred embodiment is described with reference to FIG. 1. A support computer system as may be utilized by the preferred embodiment generally comprises a bus structure or other communication means 101 for communicating information between the various components of the computer system, a processor 102 coupled with said bus 101 for processing information, a random access memory (RAM) or other storage device 103 (commonly referred to as a main memory) coupled with said bus 101 for storing information and instructions for said processor 102, a read only memory (ROM) or other static storage device 104 coupled with said bus 101 for storing static information and instructions for said processor 102, a display monitor 105 is coupled with said bus 101 for communication with the processor 102, a data storage device 106, such as a magnetic disk and disk drive, coupled with said bus 101 for storing information and instructions, an alphanumeric input device 107 including alphanumeric and other keys coupled to said bus 101 for communicating information and command selections to said processor 102, a cursor control device 108, such as a mouse, track-ball, cursor control keys, etc., coupled to said bus 101 for communicating information and command selections to said processor 102 and for controlling cursor movement. Additionally, the system will typically include, one or more ports for receiving input signal data. Such ports are illustrated here as serial port 108 and parallel port 109, and VME bus driver 111.

The pattern display system 112 is coupled to the computer support system 100 through the VME bus 113 A VME structure is a well known bus structure for computer systems. The pattern display system 112 is used to generate the pixel pattern data which represents the data signal. A display monitor 114 is coupled to the pattern display system 112 for displaying the pattern signal. The pattern display system 112 is coupled to the VME bus 113 for communication with the processor 102. The pattern display system 112 is described in greater detail below.

It should be noted that the processor 102 is also utilized for performing various processing functions of the present invention, including generation of patterns offsets and Look-Up Table values. Further, patterns and Look-Up Tables may be stored in the data storage device 106.

Pattern Display System

Figure 2:
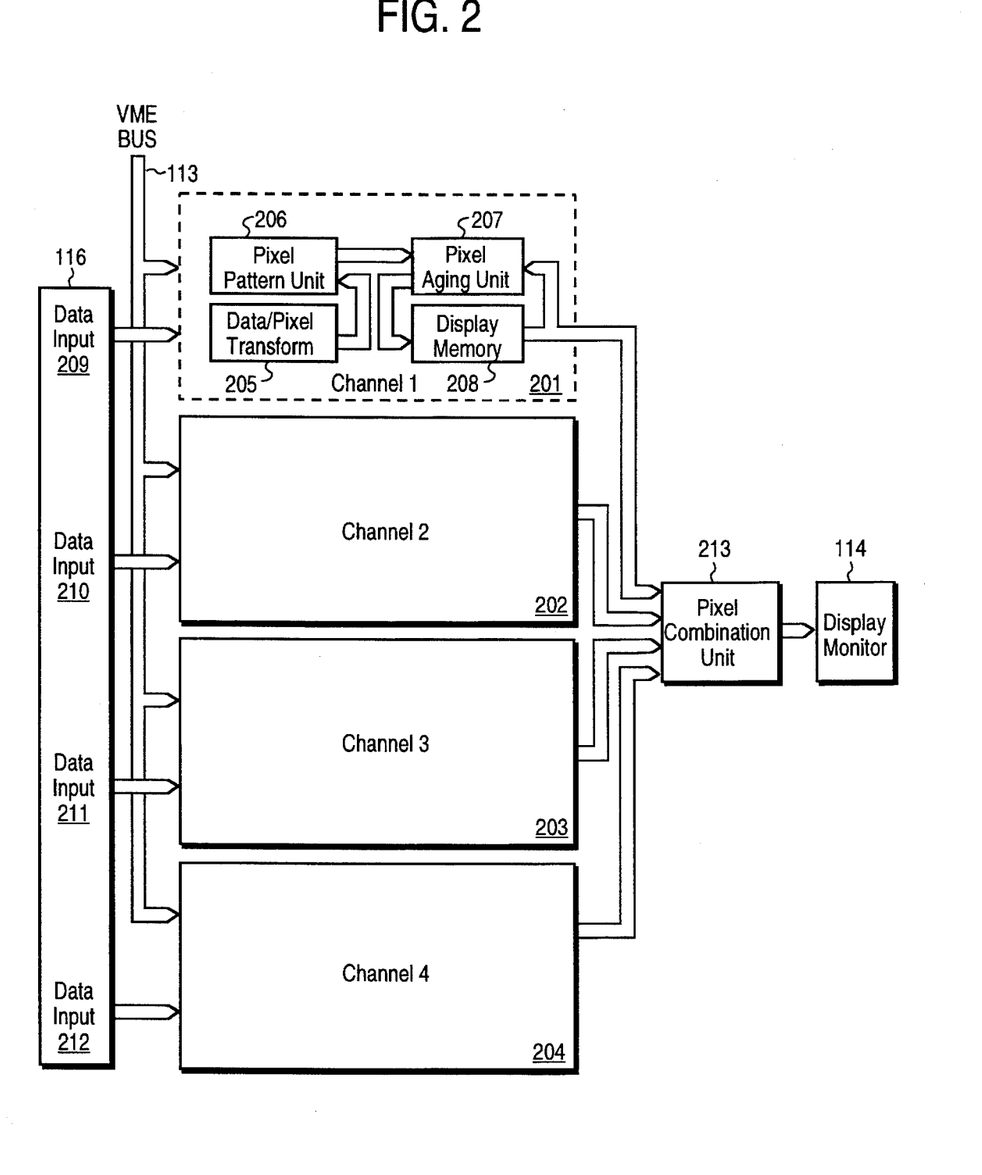
FIG. 2 is a block diagram of a Pattern Display System as may be utilized in the currently preferred embodiment of the present invention.

FIG. 2 illustrates the pattern display system of the currently preferred embodiment of the present invention. Referring to FIG. 2, the multi-channel signal data display apparatus is seen to consist of four pattern display channels 201–204. Each channel processes input signal data to convert it to pixel patterns stored in a channel frame buffer. In the currently preferred embodiment, the input data is in complex number format so that each data sample represents a vector value. This facilitates the representation of signal magnitude, signal phase, and signal frequency. A complex data format is commonly used in current Digital Signal Processing (DSP) systems, digital receivers, and digital data transmission systems. Real digital data can be converted to complex digital data with currently available DSP chips (e.g. Part #GC-1012 available from GrayChip, Inc. of Palo Alto, Calif.). The use of other numeric formats would not cause departure from the spirit and scope of the present invention. The pixel data in each channel frame buffer is read simultaneously to provide screen refresh data to a Pixel Combination Unit (PCU). This unit determines which of the four pixels is displayed, or how individual pixels from each channel are blended to produce single pixels for display monitor 214. The resulting pixel stream is fed to a conventional RAMDAC to merge overlay data and to convert 8 bit pixel data to RGB video for the display monitor 214. While the currently preferred embodiment is shown with four channels, different embodiments using more channels, or as few as one channel are possible.

Referring back to FIG. 2, each channel consists of four components. The first, the Data/Pixel Transform Unit (DPTU) 205, receives raw complex digital data samples, transforms them to a pixel color and intensity, and derives x and y offset magnitudes which determine the location of the pixel on the display monitor. The second component is the Pixel Pattern Unit (PPU) 206 which reads "root" pixel addresses stored in a local pattern memory, adds them to offset values computed for each pattern cycle, and then adds data magnitude values to derive the final frame buffer pixel address. The third component is the Pixel Aging Unit (PAU) 207 which controls writing new 16 bit pixel words to the Frame Buffer (FB) 208 memory. The PAU 207 reads 20 pixel words at a time from the Frame Buffer 208 to refresh the display, and at the same time, addressing the pixel aging lookup tables with the 20 pixels to provide 20 new modified pixels, and then writing the modified pixels back into the Frame Buffer to replace the original pixels. The Frame Buffer 208, stores 16 bit pixel values for the display, which in the preferred embodiment has a 1280 pixel width and a 1024 pixel height.

Figure 7:
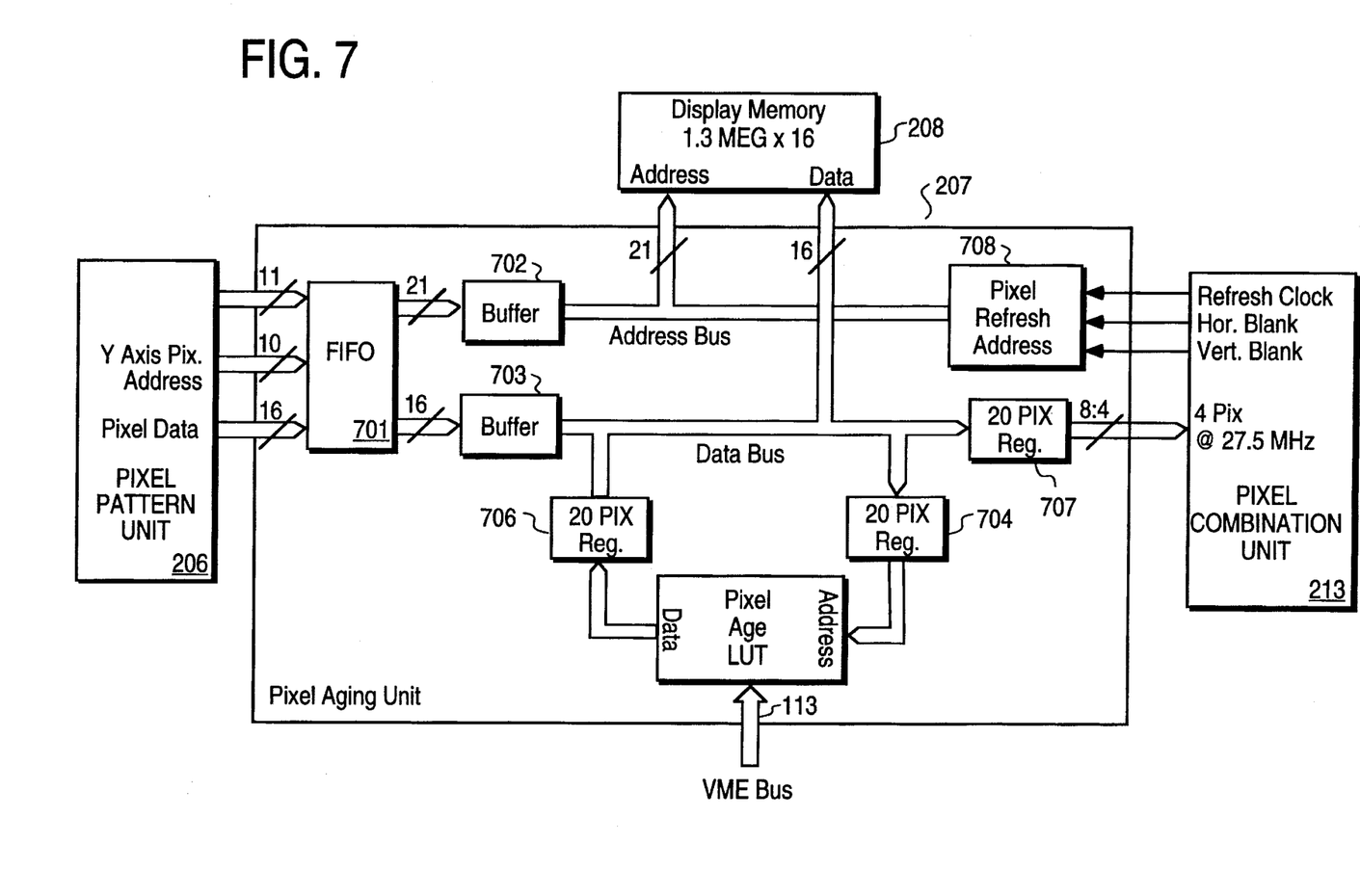
FIG. 7 is a block diagram showing the principal circuits of a Pixel Aging Unit (PAU) which stores new pixel data in frame memory, outputs refresh pixel data each display cycle and supplies pixel data to a pixel aging Look-Up Table, and writes age modified pixel data back to a frame buffer memory as may be utilized in the currently preferred embodiment of the present invention.

While FIG. 2 shows a display channel capable of providing one display pattern to the Frame Buffer 208, multiple DPTUs and PPUs can be implemented within a channel to provide multiple display patterns in each channel frame buffer. In the currently preferred embodiment, each pattern would require it's own DPTU and PPU. Pixel address and pixel color and intensity information is then fed to a single FIFO at the input to the channel's PAU (as illustrated in FIG. 7).

General Technique of The Present Invention

The present invention is used to display digital samples of a source signal in a manner which allows rapid visual recognition of the various timing and modulation characteristics of the source signal. These displays are generated by using preprogrammed "root pixel addresses" to control the display locations of successive source signal samples.

Figure 3:
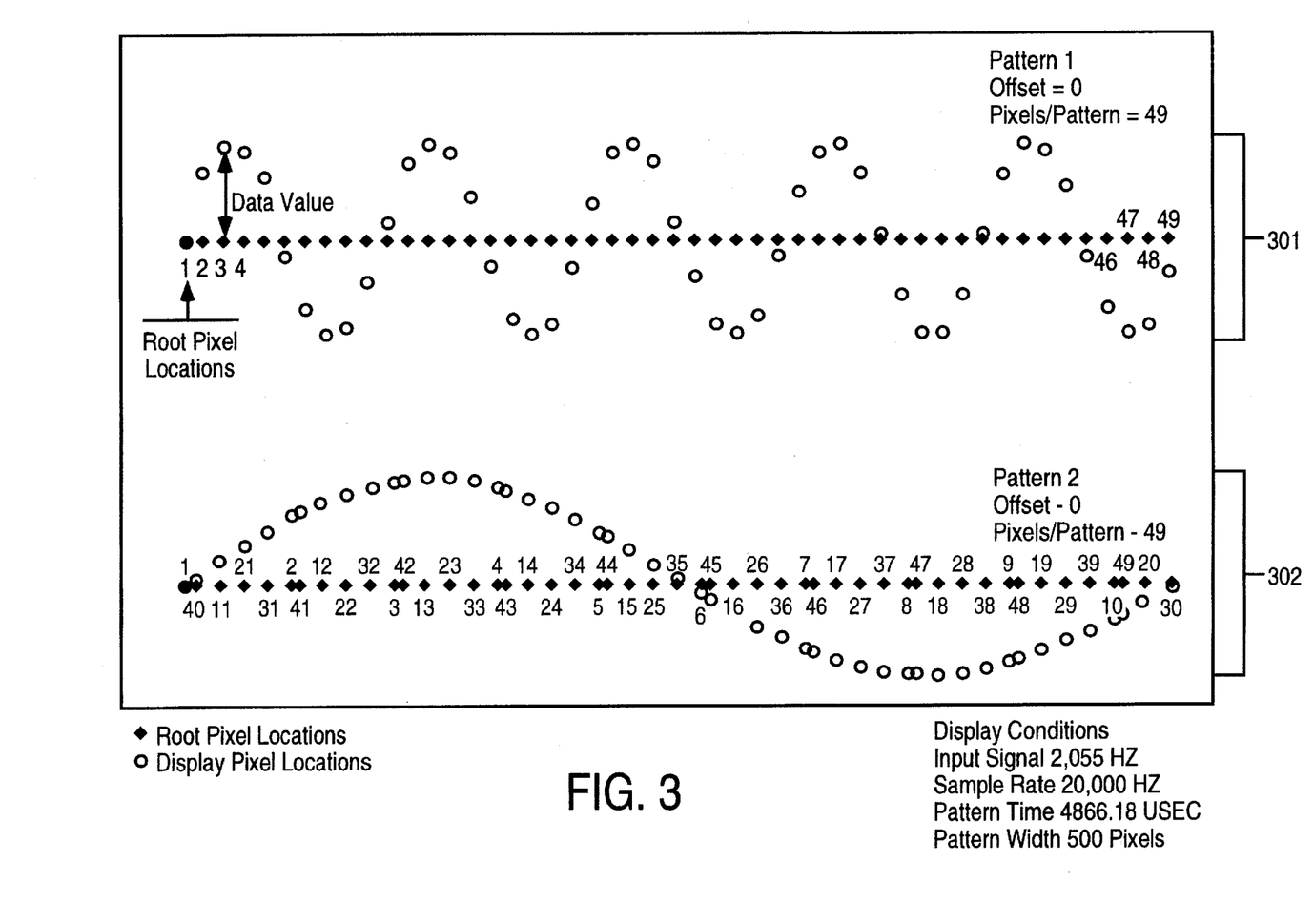
FIG. 3 is a graphical representation of a display in which the same data is simultaneously displayed using two different pixel patterns, as may be performed in the currently preferred embodiment of the present invention.
Figure 4:
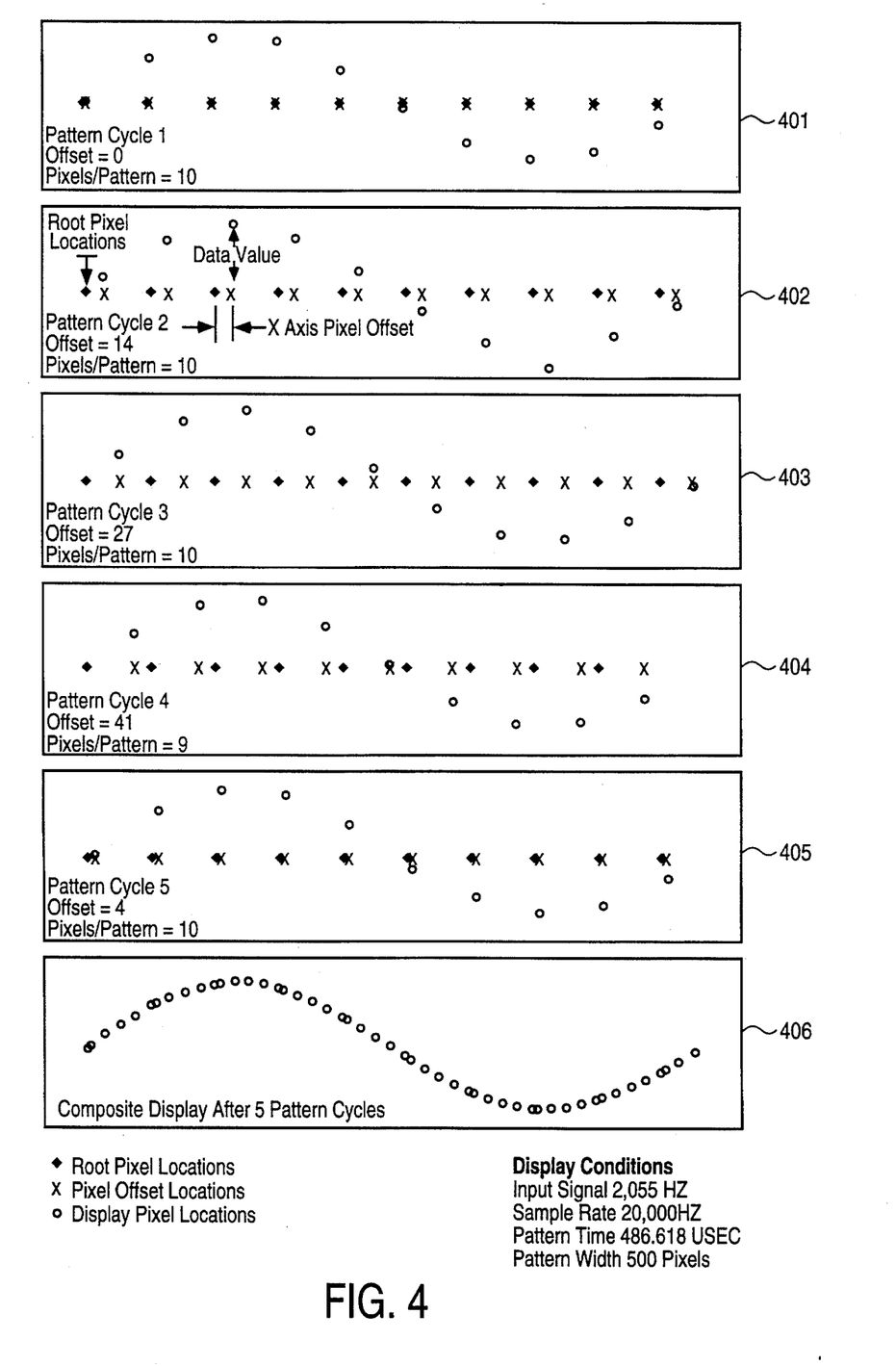
FIG. 4 is a graphical representation of how a pattern is used repeatedly by adding fixed offsets to the root pixel addresses of a pattern, as may be performed in the currently preferred embodiment of the present invention.

Two display examples are provided in FIGS. 3 and 4 to illustrate how a root pixel pattern stored in memory is used to derive Frame Buffer addresses for successive data samples. FIG. 3 shows two different patterns, 301 and 302 which simultaneously display the same 49 data samples. Pattern 301 shows five cycles of a sine wave with each of the 49 data sample positioned in time order. Pattern 302 shows the same data with the position of the root pixels interspersed to produce a pattern with the 5 sine wave cycles overlaid. As will be described in more detail below, each input data value is transformed by the DPTU to provide magnitude values which are added to successive pattern root pixel addresses. This provides Frame Buffer pixel addresses for each input data sample which ultimately provides the pattern of pixels displayed on the monitor.

The root pixel addresses in the pattern 302 were computed for a simple signal to cause the input data to appear as a composite single sine wave, and used a constant timebase. Display patterns can use multiple timebases and lines of data as shown in FIG. 3 can be repeated at different vertical display positions. This flexibility to design a display pattern for a specific signal enables the viewer to rapidly observe deviations from the expected signal characteristics. For example, if one cycle in pattern 301 should deviate from the norm, such a deviation would become readily apparent from the display of pattern 302 as an aberration to the smooth cycle.

In practice each pattern is repeated with many cycles to display a long sequence of data values. When the pattern time is not a multiple of the data sampling interval, a condition normally encountered, a fixed pixel offset from the root pixel address must be calculated and used for every display pattern cycle after the first cycle. The offset required for each pattern cycle is the pixel remainder at the end of the preceding pattern cycle. This pixel remainder must be applied to the next pattern, and this is done using the nearest integer value since only pixel dimensions are involved. In the mathematical calculations however the fractional values must be retained for accuracy. Omission of the offset would cause the signal pattern to be distorted. This process of adding offsets to the root pixel address values is illustrated in FIG. 4. Here, the same data shown in FIG. 3 is shown with a short pattern cycle of ten data values. Five successive pattern cycles 401–405 are shown with pixel offsets required for patterns 402 through 405. If pixels remain in the frame buffer for five pattern cycles, the composite display will be identical to pattern 302 of FIG. 3 (shown here as pattern 406). It should be noted that the number of root pixel addresses used for a pattern cycle is not always the same. Periodically one less pixel address is used, and in the example shown in FIG. 4, that occurred during pattern cycle 404. It should also be noted that the offsets are constant for an entire pattern cycle, and changed for each pattern cycle. A following section will describe in more detail how a start pattern address, an end pattern address, and x and y coordinate offsets are used for each pattern cycle. These values, provided by the support computer through the VME bus 113 are required for each pattern cycle. They are also used to allow the observer to change the phase of the pattern relative to the data, and to modify the pattern without disturbing the data/pattern phase relationship.

Data/Pixel Transform Unit

Figure 5:
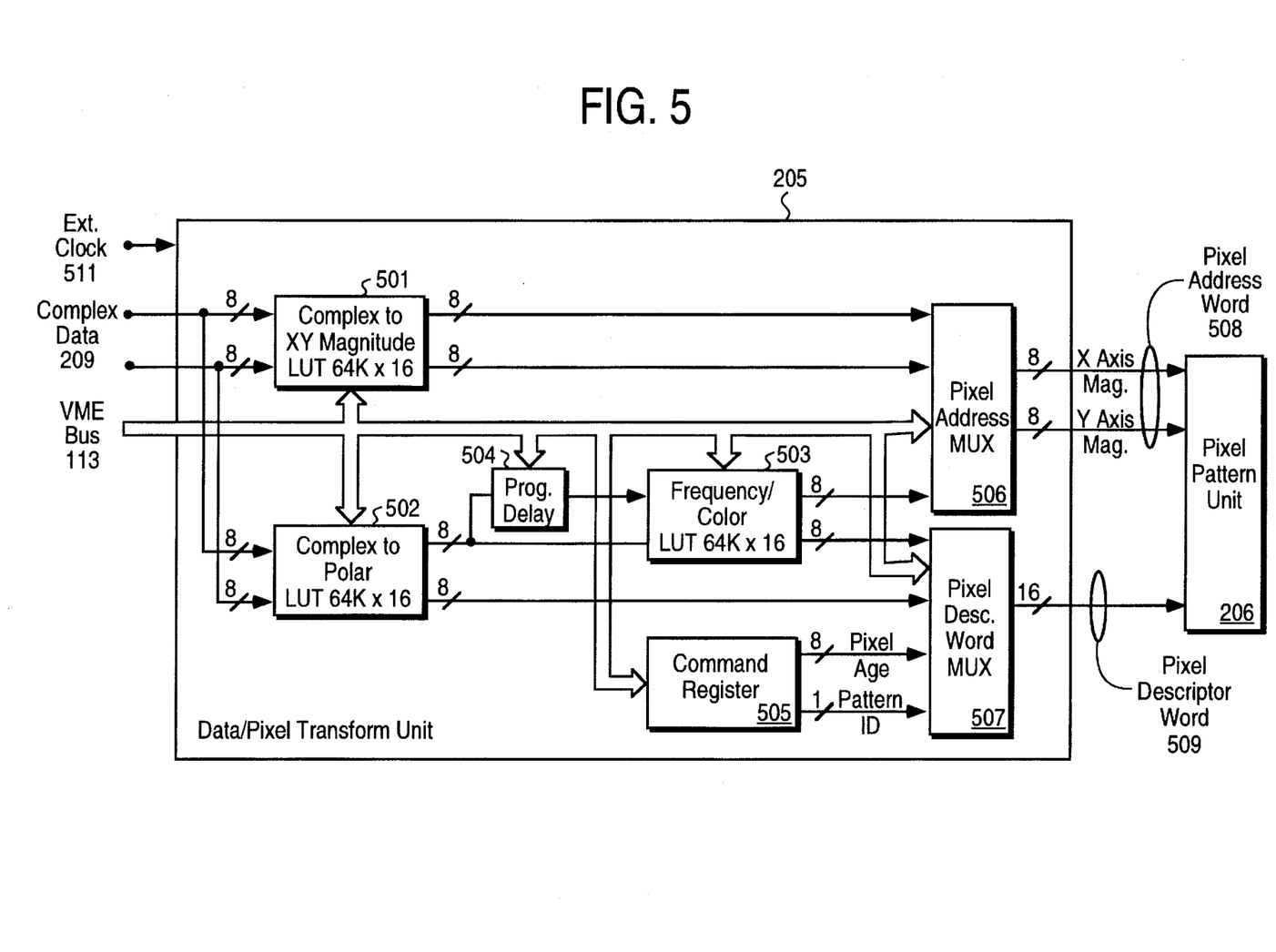
FIG. 5 is a block diagram showing the principal circuits of a Data/Pixel Transformation Unit (DPTU) which is used to generate transformed data magnitudes to X and Y pixel addresses, color and intensity data from digital samples of a signal waveform, ,as may be utilized in the currently preferred embodiment of the present invention.

FIG. 5 shows a block diagram of Data/Pixel Transform Unit (DPTU) 205. The DPTU 205 converts an input complex data sample 510 into a pixel descriptor word 509, and a pixel address word 508. The pixel descriptor word 509 describes the color and intensity of the pixel value, and the pixel address word 508 describes the displacement of the pixel from the it's root position as given in display pattern. The DPTU 205 uses three look up tables (501–503) to transform the input data 510 to the pixel address word 508 and pixel descriptor word 509. The table memories are loaded with data specific to a pattern when that pattern is initiated. Typically, that data which is associated with the root pixel pattern is stored in the support computer's memory 103, and would have been transferred to the DPTU 205 by means of the VME bus 113 with initiation of the pattern.

The input 8 bit complex data is applied as an address to two 64k X 16 Look-Up Table (LUT) memories. The first, LUT 501, converts the complex data to two eight bit magnitudes (X and Y) which are added to the pattern root pixel addresses to determine the data sample pixel location. Depending on the pattern design, this LUT can be programmed to convert the complex data to a vector magnitude on either x or y coordinate address line, or to leave the data in complex form to allow a polar display of data. This LUT also serves as a gain control by scaling amplitude values and can if desired be programmed to convert the linear data values to logarithmic values. The two 8 bit output values from LUT 501 are sent to a pixel address multiplexer 506 which controls how these data outputs are connected to the PPU 206 X and Y coordinate address lines.

The input complex data is also applied to LUT 502. The LUT 502 converts the complex data to 8 bit phase and magnitude data. Phase data is applied to LUT 503 and also through a programmable delay line 504 to the same LUT 503. The programmable delay line 504 provides a previous data value phase LUT 503. By applying the current data phase and the previous data value phase to LUT 503, two 8 bit outputs are outputted which can be made proportional to phase, or frequency since that is analogous to the phase shift between samples. Normally both outputs are programmed to represent frequency with one applied to pixel address multiplexer 506 and the other applied to pixel descriptor word multiplexer 507. The frequency data is applied to the address multiplexer 24 so that frequency is available to determine data pixel position. The frequency data applied to pixel descriptor word multiplexer 507 is normally scaled to represent 64 colors with only 6 of the 8 bits active. The 8 bit magnitude data from LUT 502 is also applied to pixel descriptor word multiplexer 507, and normally this output is scaled to provide four levels of pixel intensity, with 2 bits active. By combining these 2 data inputs in the pixel descriptor word multiplexer 507, data frequency can control pixel color, and data magnitude can control pixel intensity. The distribution of bits representing pixel color and intensity can be varied by changing the table values in LUTs 502 and 503.

In the currently preferred embodiment the pixel descriptor word that is output by pixel descriptor word multiplexor 507 requires 16 bits. Eight bits are used for color and intensity, (from LUT 503), 7 bits are used to represent pixel age, and 1 bit is reserved for pattern ID (both from command register 2). Age and ID bits are assigned through a command register 505 which receives data through the VME bus 113. The pixel descriptor word multiplexer 507 controls the selection of pixel color and intensity, age and pattern ID bits to provide a flexible format for the pixel word to accommodate different data displays.

Pixel Pattern Unit

Figure 6:
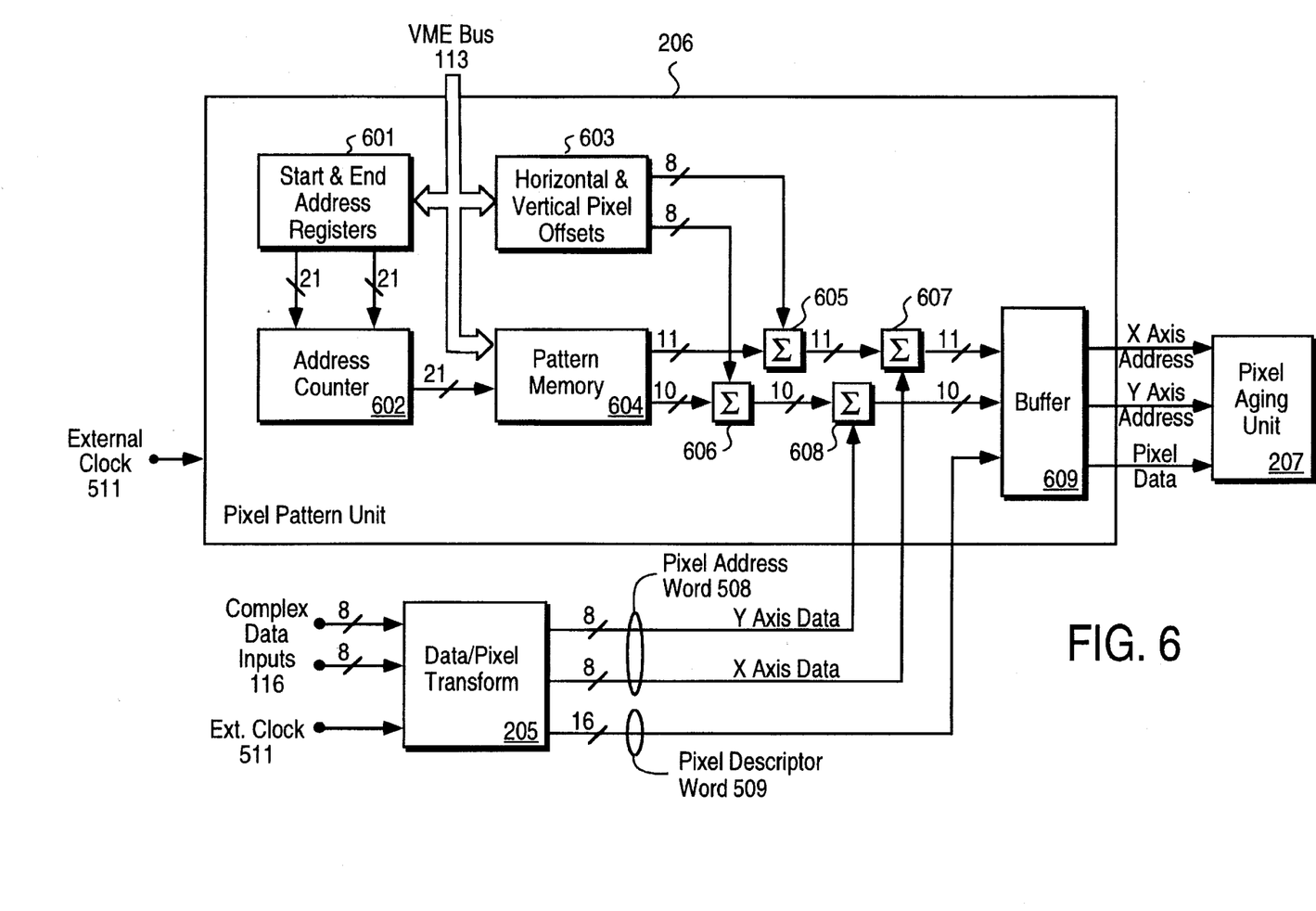
FIG. 6 is a block diagram showing the principal circuits of a Pixel Pattern Unit (PPU) which is used to create a final pixel frame address from a pixel pattern root address, pattern offset values to root addresses, and transformed data magnitudes to the x and y pixel addresses as may be utilized in the currently preferred embodiment of the present invention.

As shown in FIG. 6, x and y axis magnitude data is applied to the Pixel Pattern Unit (PPU) 206 to be combined with pattern root pixel addresses. When a display pattern is desired, the VME bus 101 is used to load preprogrammed root pixel addresses into pattern memory 604, the start and end pattern addresses into register 601, and the horizontal and vertical pixel offsets into offset register 603. When the pattern is initiated, the root pixel address counter 602 addresses the pattern memory 604 to read an x and y root pixel address. Pixel offset values from offset register 603 are then added to the root pixel addresses with adders 605 and 606. The results of the addition, an interim pixel address, is then added to the x and y axis data values by adders 607 and 608 to get a final frame buffer address where the data pixel will be stored. Operation of the PPU 206 and the DPTU 205 are controlled by the same external clock 511 so that operation of the two units is synchronous.

There are numerous changes in the display which may be initiated by the observer. Most often, these changes will be adjustments to the phase of the pattern relative to the incoming data. This is implemented in the associated computer system where a computation of the desired phase shift, based on the observer's inputs using a mouse and keyboard, results in modified start and end addresses for the display cycle which will result in a shift in pattern phase.

Pixel addresses require 11 bits for the horizontal position and 10 bits for the vertical position. The pixel frame buffer address and pixel descriptor word are applied to buffer 609 and subsequently to Pixel Aging Unit 207.

Pixel Aging Unit

FIG. 7 illustrates the Pixel Aging Unit (PAU) in greater detail. Pixel address words and pixel descriptor words are received by a First In First Out (FIFO) structure 702. FIFO 702 separates circuits operating with the input data clock from circuits operating with a 27.5 MHz display pixel refresh clock. This embodiment of PAU operates in a cycle requiring 5 clock cycles.

In the first cycle, four 8 bit pixels from register 707 are applied to PCU 213, 20 pixels in frame buffer 208 are addressed by address buffer 708 and 20 pixels are read out to registers 707 and 704. Only 8 color and intensity bits are stored in register 707.

During the second cycle, four 8 bit pixels from register 707 are applied to PCU buffer 213, ten pixel words from register 704 are applied to age LUT 705, frame buffer 208 is addressed by buffer 702, an input pixel word from buffer 703 is written to frame buffer 208, and ten pixel words read from age LUT 705 are applied to the age register 706.

During the third cycle, four 8 bit pixels from register 707 are applied to PCU 213, ten pixel words from register 704 are applied to age LUT 705, frame buffer 208 is addressed by buffer 702, an input pixel word from buffer 702 is written to frame buffer 208, and ten pixel words read from age LUT 705 are applied to the age register 706.

During the fourth cycle, four 8 bit pixels from register 707 are applied to PCU 213, frame buffer 208 is addressed by buffer 702, an input pixel word from buffer 702 is written to frame buffer 208.

During the fifth cycle, four 8 bit pixels from register 707 are applied to PCU 213, 20 pixel locations in frame buffer 208 are addressed by address buffer 708, and 20 pixels from register 706 are stored in frame buffer 208.

This five cycle sequence is modified in two ways at different times. During horizontal and vertical blanking intervals, only new pixel data write cycles occur, and at other times the pixel aging is inhibited for a full frame cycle. The aging is inhibited for a complete display cycle to load a new aging profile in the lookup tables, and is inhibited at times which are intervals of a display cycle to extend the aging period.

Pixel Combination Unit

Figure 8:
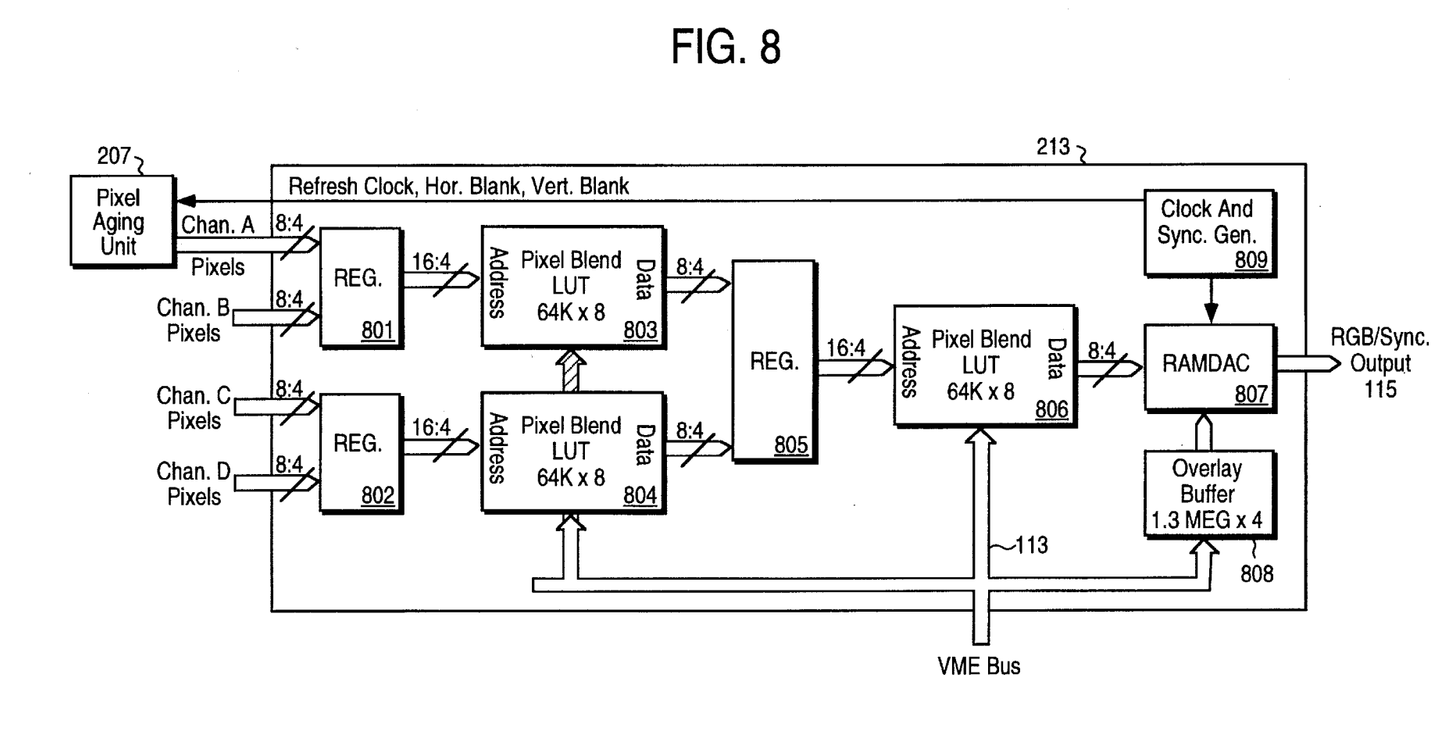
FIG. 8 is a block diagram showing the principal circuits of a Pixel Combination Unit (PCU) which receives simultaneous pixels from independent frame memories, and prioritizes or blends the pixels to create a final pixel value, as may be utilized in the currently preferred embodiment of the present invention.

The four 8 bit pixel bytes, outputted from register 707 of PAU 207 are applied to register 801 in the Pixel Combination Unit 213 as shown in FIG. 8. At the same time using the same clock, four 8 bit pixel bytes are output from channels B, C, and D. The bytes from channel B are applied to register 801 while the pixel bytes from channels C and D are applied to register 802. With the next clock cycle the outputs from registers 801 and 802 are applied to pixel blend LUTs 803 and 804. These tables are loaded with data which determines how each pair of pixels is combined. The simplest combination rule is simply channel priority. If for example channel A has priority, then any channel A pixel input at any intensity other than black is output by the blend LUT. Channels can be programmed for intensity level priority or color priority or even age priority by using one bit in the pixel word for that function. It is also possible to blend pixel colors, or to identify similar colors from the separate channels. The pixel byte outputs of LUT tables 803 and 804 are applied to register 805, and one clock cycle later, the output of register 805 is applied to pixel blend LUT 806. Again, the pixel output from the channel A, B combination is blended with the channel C, D combination and is output four pixels at a time and applied to RAMDAC 807. The conventional RAMDAC accepts four parallel pixel bytes, assigns colors to them, and converts the resulting 8 bit values for RGB colors to signals suitable for driving a conventional bit-mapped display unit 214. Vertical and horizontal sync output by the clock and sync circuits 809 are also applied to the display unit 214. Also shown in FIG. 8 is a conventional overlay buffer 808 which is controlled in a conventional manner to output overlay and underlay information to RAMDAC 807.

Operation Of The Pattern Display System

Figure 9A:
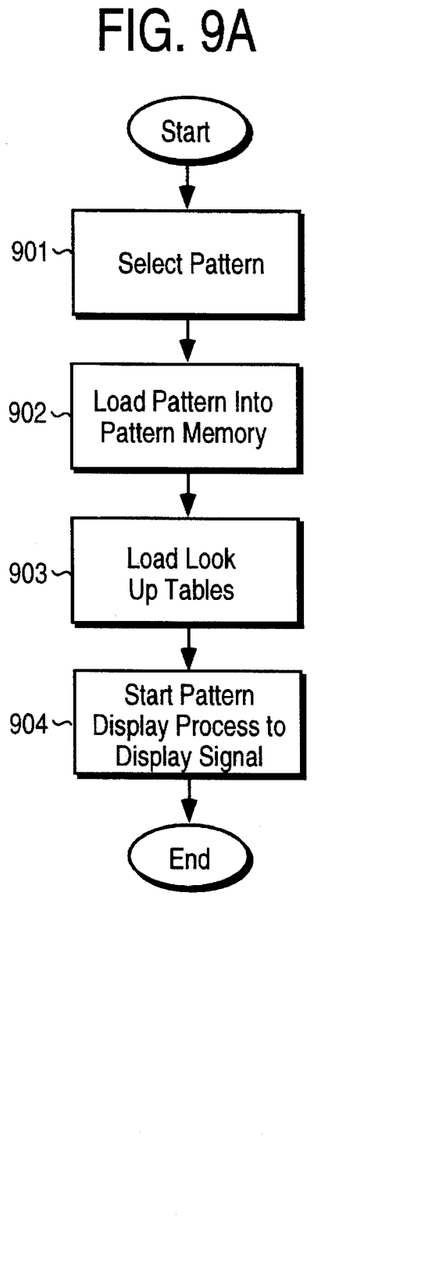
FIG. 9a is a flow chart illustrating the basic steps of a first option for operating the pattern display system or the currently preferred embodiment of the present invention.
Figure 9B:
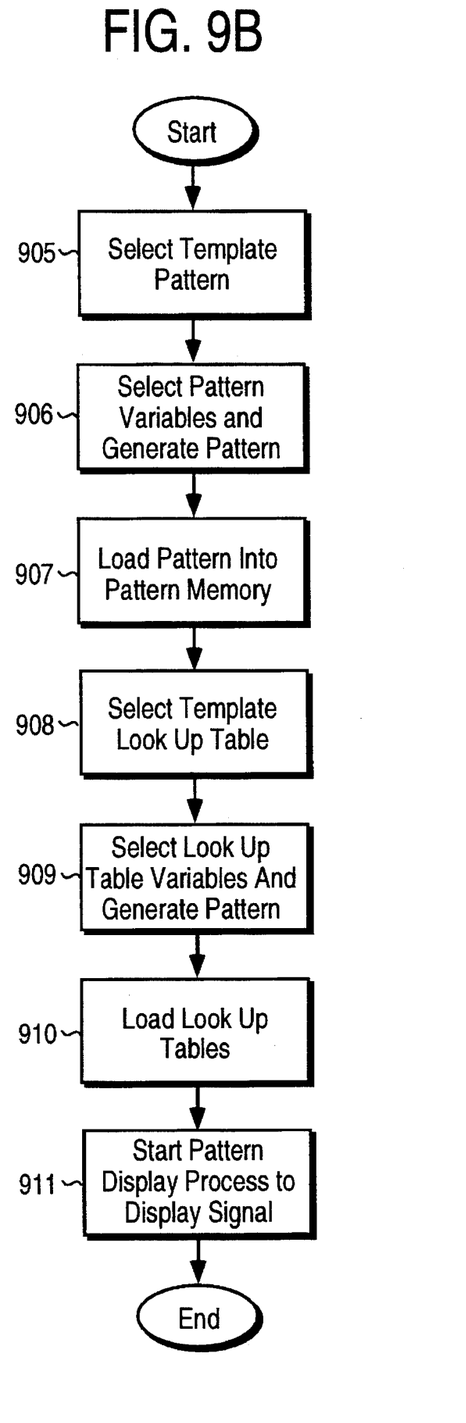
FIG. 9b is a flow chart illustrating the basic steps of a second option for operating the pattern display system or the currently preferred embodiment of the present invention.

The operation of the pattern display system is further described with the flow charts of FIGS. 9a, 9b and 10–12. FIGS. 9a and 9b illustrate the basic steps for initiating a new pattern display. This process may proceed in two ways. In most cases the user will initiate a display using a display pattern stored in the computer memory, but at times, a new pattern may be implemented by the user. With the first option, illustrated in FIG. 9a, a pattern stored in RAM 103, FIG. 1, is selected by the user, step 901. This pattern along with others which may be useful for the particular user task would be preprogrammed for the particular signal, and signal sampling rate, and stored in the support computer RAM memory. In most cases, these patterns are designed by experts with both a complete knowledge of the signal, and an understanding of the characteristics which must be monitored. A large number of patterns can be made available in memory to accommodate changes in the input signal. After selection, the display pattern is loaded through the VME bus into the pattern memory, step 902. Next, the look-up-tables associated with the pattern are loaded in their respective LUTs within the Pattern Display Unit, step 903. At this point the pattern display process to display the signal may be initiated, step 904.

The second option is illustrated with reference to FIG. 9b. Using the second option, the user will modify a display pattern, or LUT to improve the display for his purposes, and at other times, generate a new display. An example of how two displays can be made to display data is shown in FIGS. 3 and 4 where overlaid samples create a visual effect which makes identification of certain signal characteristics very easy. To generate a new display pattern the user must know the sampling frequency, the signal format and modulation characteristics. Using this information, the user selects a template pattern from various source patterns, step 905. Then the input variables are selected which will optimize the visualization of specific signal features, and the new pattern is generated, step 906, and loaded into the pattern memory, step 907. Once the pattern is generated, the various Look-Up Tables must be generated. These Look-Up Tables contain the various pixel addressing, pixel intensity and pixel aging criteria used in the pattern display system. The different Look-Up Tables allow great flexibility in controlling the appearance of the display patterns. For example, in the aging Look-Up Table showed with reference to FIG. 7, the pixel age Look-Up Table may cause the pixel to change color, to fadeout, or completely disappear upon reaching various pixel age thresholds. In other instances, e.g. the complex to X, Y magnitude LUT and the complex to polar LUT transform functions are more fixed. These Look-Up Tables do however, provide scaling functions to accommodate signal variations. While these functions could be performed and calculated arithmetically, the use of a Look-Up Table is in this instance is simpler, quicker, and more flexible. The values may be calculated once on the host processor and then provided to the Look-Up Tables. In any event, once the user has selected template Look-Up Tables, step 908, selected the Look-Up Table variables and generated the Tables, step 909, the Look-Up Tables are loaded, step 910 and the new pattern display is started, step 911.

Figure 10:
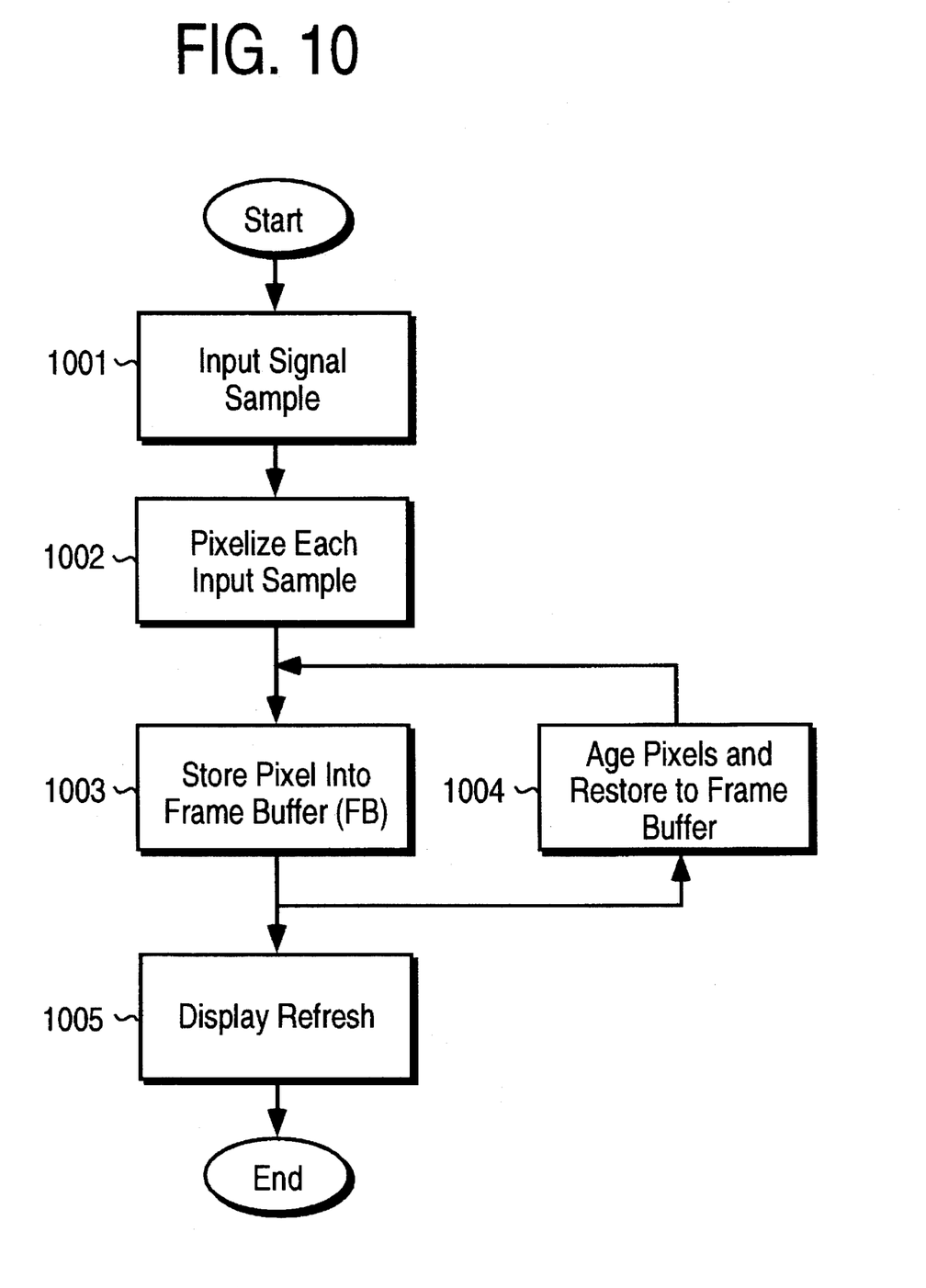
FIG. 10 is a flow chart which illustrates the steps for the pattern display process of the currently preferred embodiment of the present invention.

The process of receiving an input data sample through the frame buffer storage of a display pixel representing that data value is described with reference to FIG. 10. First, an input signal sample is received, step 1001. As noted above, the input signal sample is a digital representation of a complex number. Each of the input signal samples is then pixelized, step 1002. Pixelized refers to the process of converting the input data sample to a pixel frame buffer address and pixel color and intensity. Note that the pixelization occurs for each input signal sample provided to the respective channels of the pattern display system. The steps of the pixelization process are described in greater detail below with reference to the flowchart of FIG. 11. In any event, after input signal samples are pixelized, they are stored in a frame buffer, step 1003. The frame buffer is continuously read out to refresh the display, and as this occurs, the output pixels are aged, step 1004, and then restored to their original positions in the frame buffer, step 1003. The steps for aging of the pixels in the frame buffer is further described with reference to FIG. 12. Aging of pixels is very important since it provides a means to introduce visual clues as to the characteristics of the signal over time, and erases old data values from the frame buffer after a specified time.

Figure 11:
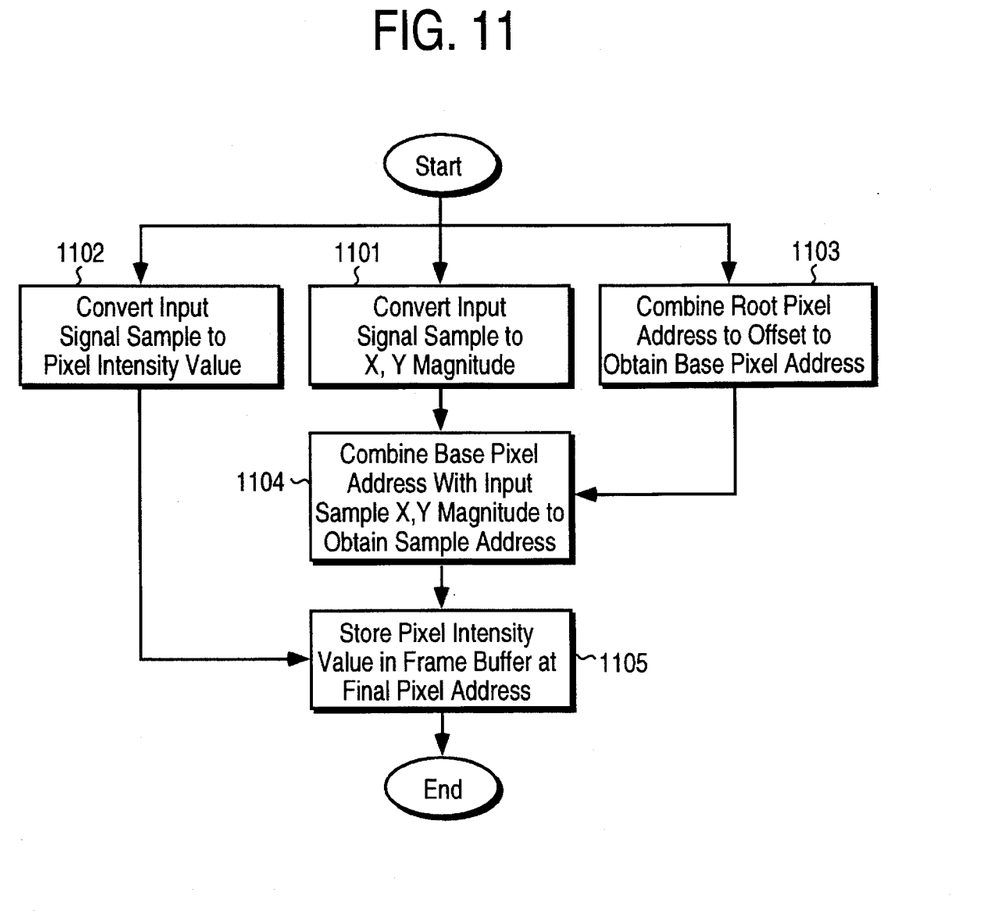
FIG. 11 is a flow chart which illustrates the steps for pixelization of a data sample signal as may be performed in the currently preferred embodiment of the present invention.

FIG. 11 is a flow chart which describes the pixelization process in more detail. First, an input signal sample is converted with step 1101 to X, Y magnitudes which are used to derive pixel display position, and at the same time with step 1102, the input signal sample is converted by Look-Up Tables to a pixel color and intensity value. Also at the same time with step 1103, the next root pixel pattern address read from the pattern address buffer, is combined with a display pattern offset. This offset is a constant for each display pattern cycle. Step 1103 results in a base pixel address for the input signal sample. After the base pixel address is calculated, it is combined in step 1104 with the input signal sample X, Y magnitudes to obtain the final pixel address for that sample. Finally with step 1105, the pixel color/intensity value derived in step 1102 is stored in the frame buffer at the final pixel address derived in step 1104. This process is continued for each new signal sample, with root pixel addresses read in sequence so that as the root pixel addresses are repeated, the pixel display pattern also repeats.

Figure 12:
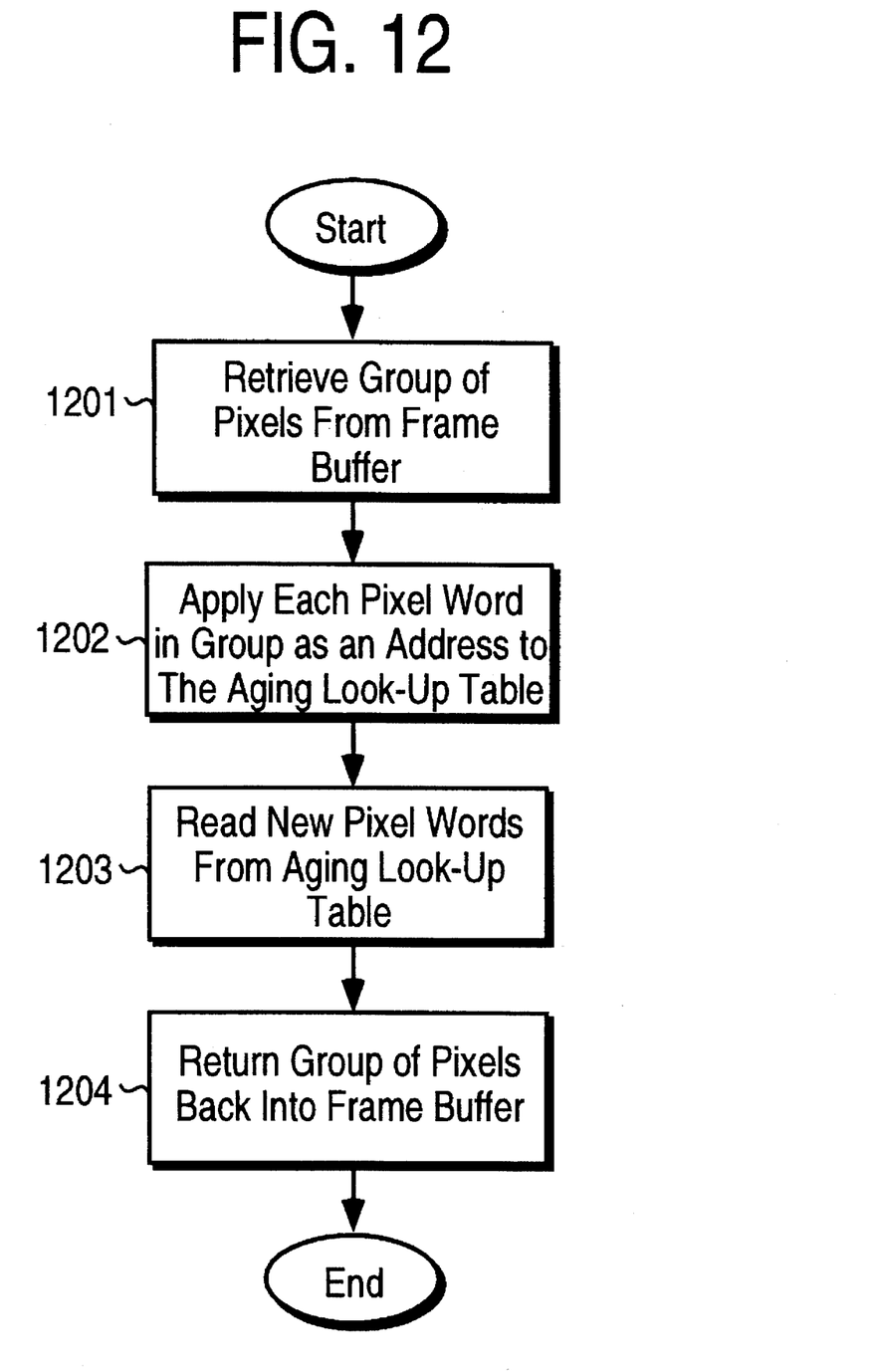
FIG. 12 is a flow chart which illustrate the steps for performing pixel aging in the currently preferred embodiment of the present invention.

FIG. 12 is a flow chart describing the four steps in the pixel aging process. First in step 1201, a group of pixels is read from the frame buffer. This group of pixels is provided to refresh the display, and also to provide a group of pixels for the pixel aging process. Each pixel word containing color/intensity and age information is applied as an address to an Aging Look-Up Table. The data in the table addressed by the pixel is normally different than the input data value so that pixel aging can occur. In the simplest case each address and read cycle of the Aging LUT would result in the pixel having the same color/intensity value, but the age value would be reduced by one. After 128 cycles, assuming 7 bits of the pixel word are assigned to age, the age would go to zero and the pixel's color/intensity value should then be set to a zero value. In practice however, the LUT can be loaded to cause the color/intensity values to reset to zero on any cycle. If desired, the aging rate can be made a function of the pixel color/intensity, and it is possible also to change the pixel color/intensity as a function of age. Therefore the aging process simply consists of four steps. After the first step 1201 described above, the group of pixels is used to address a group of Aging Look-Up Tables. A group of new pixel values which have been modified by the aging process is read from the Look-Up Tables with step 1203. Finally the aged group of pixels is written back into the original frame buffer locations with step 1204.

While the present invention has been described with reference to support by a general purpose computer system in FIGS. 1–12, it will be appreciated that the figures illustrate an embodiment of the invention only, and do not limit the spirit and scope of the present invention. It should be noted that the present invention may be realized using a variety of computer hardware and software programming techniques, and is not limited to the described hardware and software configuration. The present invention may be utilized in any embodiment having a bit-mapped display system. As an example, a fixed function system for monitoring broadcast television signals could embody the present invention. Similar types of embodiments would be within the scope of the present invention.

Thus, a data display apparatus which utilizes stored root pixel patterns to display digital data samples as pixels whose appearance is initially a function of the data, but can be modified with pixel aging and are blended with pixels from similar channels, is disclosed.

I claim:

1. A data display system for displaying a characteristic representation of a signal, said signal represented by a plurality of data samples, said data display system comprising:

a display;

a display storage coupled to said display, said display storage for storing data pixel values for said display;

receiving means for receiving said plurality of data samples;

pixelization means for converting said plurality of data samples into a plurality of data pixels, with each said data pixel having a pixel shading value and a pixel XY axis displacement value;

a pattern storage to store a pattern, said pattern representing root pixel addresses for displaying successive data samples on said display;

an offset generator to generate an offset from said root pixel addresses of said pattern for each pattern cycle;

a pixel address generator coupled to said pixelization means, said pattern storage and said offset generator, said pixel address generator deriving final data pixel addresses for each of said plurality of data pixels based on said pixel XY axis displacement values, said offset and said root pixel addresses; and a pixel aging unit coupled to said display storage, said pixel aging unit for modifying said pixel shading values of said data pixels in said display storage based on a predetermined aging criteria.

2. The data display system as recited in claim 1 wherein said pixelization means is further comprised of:

a first converter to convert said one or more successive data samples to said pixel XY axis displacement value for said data pixel; and a second converter to convert one or more successive data samples to said pixel shading value for said data pixel.

3. The data display system as recited in claim 2 wherein said offset generator is comprised of:

a processing unit to determine a horizontal offset from said root pixel addresses of said pattern and a vertical offset from said root pixel addresses of said pattern for each pattern cycle;

a horizontal offset storage coupled to the processing unit to store said horizontal offset; and a vertical offset storage coupled to the processing unit to store said vertical offset.

4. The data display system as recited in claim 3 wherein said pixel address generation is further comprised of:

a first summation circuit for generating an X Axis address from an X-Axis component of said root pixel address, a X-Axis component of said pixel XY axis displacement value and said horizontal offset; and a second summation circuit for generating a Y Axis address from a Y-Axis component of said root pixel address, a Y-Axis component of said pixel XY axis displacement value and said vertical offset.

5. The data display system as recited in claim 4 wherein said predetermined aging criteria is comprised of:

an aging criteria for controlling each pixel age; and a shading criteria for controlling pixel shading as a function of said pixel age.

6. The data display system as recited in claim 5 wherein a pixel shading value includes pixel age information.

7. The data display system as recited in claim 6 wherein said pixel aging unit is further comprised of:

aging means for modifying pixel age information of a pixel shading value based on said aging criteria; and pixel modification means for modifying pixel shading values based on said shading criteria.

8. A display system for displaying a characteristic representation of one or more input data signals, said display system comprising:

a display;

means for receiving a plurality of input data signals;

a pattern display subsystem comprising one or more signal processing units, each of said one or more signal processing units for generating data pixels from an associated input data signal and an associated predetermined pattern, wherein each of said data pixels comprises a shading value and a displacement value and further wherein said predetermined pattern defines root pixel addresses for displaying successive data signals on said display; and a blending unit for blending said data pixels from said one or more signal processing units to determine final data pixels for said display.

9. The display system as recited in claim 8 wherein each of said one or more signal processing units is further comprised of:

a frame buffer for storing said data pixels;

pixelization means for generating a pixel address and a pixel shading value for each said data pixel and storing said data pixel at said pixel address in said frame buffer; and a pixel aging unit for modifying said pixel shading values based on a predetermined aging criteria.

10. The display system as recited in claim 9 further comprises means for generating a vertical offset and a horizontal offset for a pattern during every pattern cycle.

11. The display system as recited in claim 9 wherein said pixelization means is further comprised of;

conversion means for converting said input data signal to a plurality of data pixels, with each said data pixel having a pixel shading value and a pixel XY axis displacement value;

a pattern storage to store a pattern, said pattern representing root pixel addresses for displaying successive data samples on said display;

an offset generator to generate an offset from said root pixel addresses of said pattern for each pattern cycle; and a pixel address generator coupled to said pixelization means, said pattern storage and said offset generator, said pixel address generator deriving final data pixel addresses for each of said plurality of data pixels based on said pixel XY axis displacement values, said offset and said root pixel addresses.

12. The display system as recited in claim 11 wherein said blending unit is further comprised of:

a blending circuit for determining the pixel shading values when two or more signal processing units provide different shading values to the same pixel address;

an overlay buffer for providing overlay pixel shading values; and a RAMDAC for generating output for driving said display.

13. In a data display system, a method for generating a display pattern describing the characteristics of a signal input, said signal input to said data display system as a plurality of signal samples, said method comprising the steps of:

a) generating a pattern and display values characteristic of how said signal input is to displayed;

b) loading said pattern and display values into said data display system, said pattern having a plurality of root pixel addresses for display of successive data samples, said display values provided to transform said data samples to pixel shading values and to transform said data samples to pixel XY axis displacement values;

c) generating an offset for a pattern cycle;

d) generating a pixel XY axis displacement value for a data sample using said display values.

e) generating a pixel address for a data sample based on said pattern, said offset, and said pixel XY axis displacement value;

f) generating a pixel shading value for said data sample;

g) storing said pixel shading value in a frame buffer at said pixel address;

h) repeating steps d)–g) for each root pixel address of said pattern; and i) repeating steps c)–h) for a new incoming set of signal samples.

14. The method as recited in claim 13 wherein said pixel shading value includes pixel aging information and pixel shading values, said method is further comprised of the steps of:

j) retrieving one or more pixel shading values from said frame buffer;

for each of said retrieved one or more pixel shading values:

k1) examining pixel aging information of said one or more pixel shading values;

k2) aging said one or more pixels by modifying said pixel aging information;

k3) modifying said pixel shading value according to a predetermined pixel aging criteria; and l) storing said one or more pixel shading values back into said frame buffer.

15. The method as recited in claim 14 wherein said step of loading said pattern and display values into a pattern display system is further comprised of the steps of:

a) loading said pattern into a pattern memory; and b) loading said display values into a pixel shading look-up table and into a pixel XY axis displacement look-up table.

16. The method as recited in claim 15 wherein said step of generating a pixel address for said data sample based on said pattern and said offset is further comprised of the steps of:

a) providing said data sample to said pixel XY axis displacement look-up table, and outputting the pixel XY axis displacement value;

b) retrieving a successive root pixel address from said pattern memory; and c) combining said successive root pixel address with said offset and said pixel XY axis displacement value to create said pixel address.

17. The method as recited in claim 16 wherein said step of generating a pixel shading value for said data sample is further comprised of the steps of:

a) providing said data sample to said pixel shading look-up table; and b) outputting a corresponding pixel shading value from said look-up table.

* * * * *